US011868954B1

(12) United States Patent
Singh et al.

(10) Patent No.: US 11,868,954 B1
(45) Date of Patent: Jan. 9, 2024

(54) INTERACTIVE SYSTEM FOR FACILITATING PURCHASES AND RETURNS

(71) Applicant: AMAZON TECHNOLOGIES, INC., Seattle, WA (US)

(72) Inventors: Rishabh Alaap Singh, Madrid (ES); Marco Munari, Madrid (ES)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1518 days.

(21) Appl. No.: 16/054,768

(22) Filed: Aug. 3, 2018

(51) Int. Cl.
G06Q 10/0837 (2023.01)
G07C 9/00 (2020.01)
G06K 7/14 (2006.01)
G01G 19/52 (2006.01)

(52) U.S. Cl.
CPC ....... G06Q 10/0837 (2013.01); G06K 7/1417 (2013.01); G07C 9/00182 (2013.01); *G01G 19/52* (2013.01)

(58) Field of Classification Search
CPC ............ G06Q 10/0837; G06K 7/1417; G07C 9/00182
See application file for complete search history.

(56) References Cited

U.S. PATENT DOCUMENTS

| | | | | |
|---|---|---|---|---|
| 8,311,895 B1* | 11/2012 | Murugan | ........... | G06Q 10/0837 705/26.1 |
| 10,657,486 B1* | 5/2020 | Wolter | ............... | G06Q 10/0833 |
| 2015/0052076 A1* | 2/2015 | Amato | ............... | G06Q 10/0837 705/340 |
| 2015/0193733 A1* | 7/2015 | Bouzit-Benbernou | | ..................... G06Q 10/0832 705/332 |
| 2016/0335595 A1* | 11/2016 | Levy | ........................ | G07C 9/33 |
| 2017/0293885 A1* | 10/2017 | Grady | ................ | G08B 13/2454 |
| 2017/0293886 A1* | 10/2017 | Bostick | ............ | G06Q 10/08355 |
| 2018/0365641 A1* | 12/2018 | Zhu | ........................ | G06K 7/1417 |
| 2019/0213540 A1* | 7/2019 | Petroski | ............. | G06Q 10/0837 |
| 2020/0134952 A1* | 4/2020 | Goldberg | ................. | G07F 5/26 |

OTHER PUBLICATIONS

Srivatsan Sridharan, Authenticated Secure Bio-metric Based Access to the Bank Safety Lockers, 2014, p. 1-4 (Year: 2014).*

* cited by examiner

*Primary Examiner* — Ibrahim N El-Bathy
(74) *Attorney, Agent, or Firm* — Lindauer Law, PLLC

(57) ABSTRACT

Techniques for facilitating returns of ordered items include receiving, by a control device, a first code associated with an order, determining that the code corresponds to a valid order, and granting access to a controlled access area where a user may examine the ordered items. If a second code associated with a particular item is received by the control device, a determination is made that the code corresponds to an item associated with the order, and access to a container within the controlled access area is granted. Once an item is placed in the container, sensors in the container determine characteristics of the item. If the determined characteristics correspond to item data that indicates the expected characteristics of the item, data indicative of a return of the item is generated.

20 Claims, 8 Drawing Sheets

INTERACTIVE SYSTEM FOR FACILITATING PURCHASES AND RETURNS

BACKGROUND

When a user purchases items using an online store, the user is unable to directly examine the characteristics of the items until the ordered items are delivered to the user's location. If the characteristics of the items do not meet the user's needs, this may necessitate a laborious return process that utilizes third-party shippers to transport the returned item to an appropriate location for verification and processing of the return.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
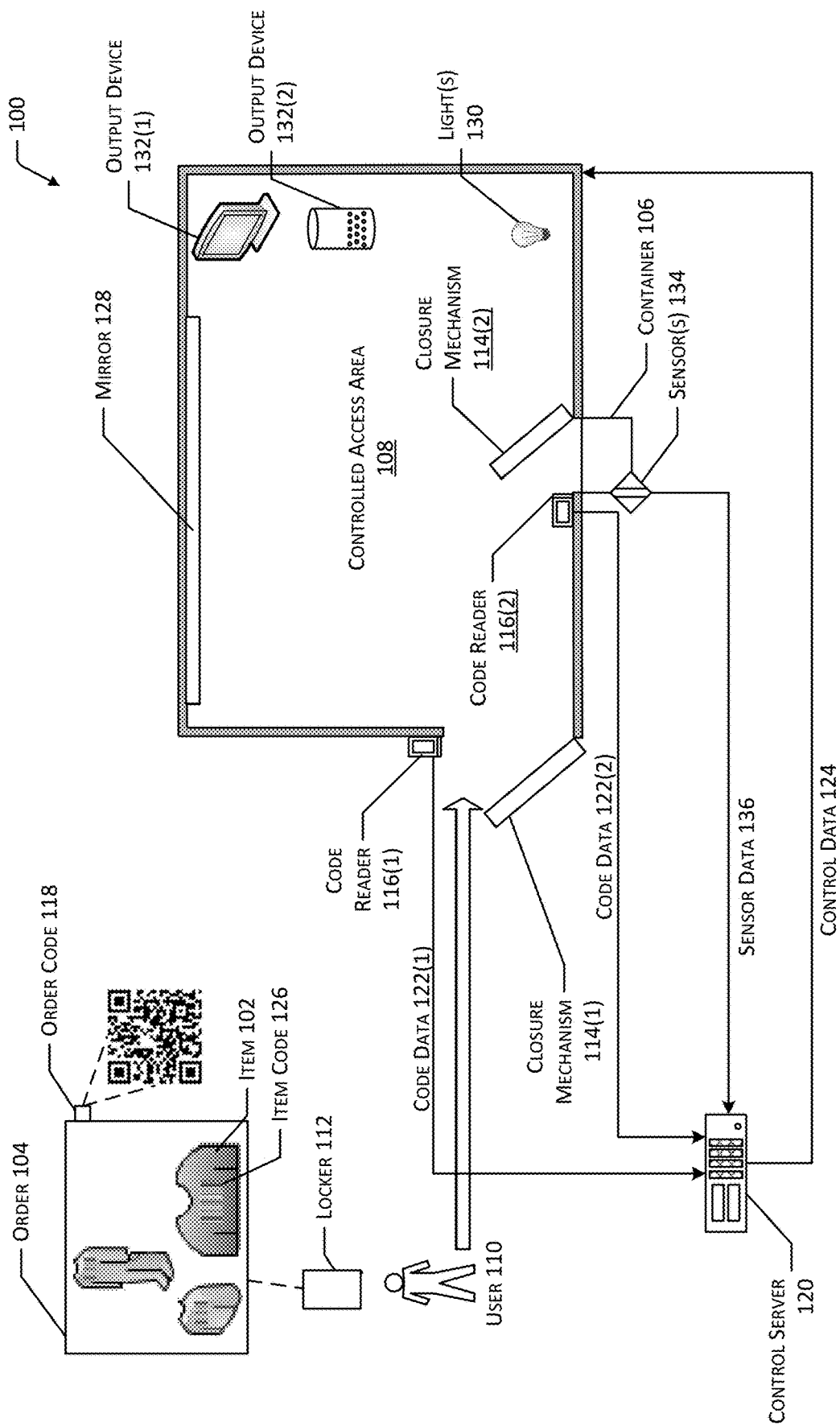
FIG. 1 depicts an implementation of a system for facilitating returns of one or more items associated with an order by using a container for receiving returned items within a controlled access area for examining the items.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When an individual purchases items at a physical brick-and-mortar location, the individual is typically able to directly examine the physical characteristics of the items. For example, when purchasing a clothing item, an individual may closely examine the style, material, cut, color, and size of the clothing item. In many cases, the individual may bring the item to a fitting room or other type of trial area to wear the item and examine the manner in which it fits the individual, the manner in which it appears on the individual's body, and the manner in which the item may be combined with other clothing items. Many individuals may choose to purchase items using an online store rather than traveling to a physical location, which may result in ordered items being shipped to a user's address. For example, an online store may include a collection of network-accessible services executed on computer hardware that provide multiple channels through which customers, using a client computing device, may access various catalogs stored in databases to find various products and services available to purchase, lease, and so forth. Channels for accessing catalogs may include, for example, mobile applications, voice-based search programs, web pages, and so forth. However, use of online stores to purchase or lease items may preclude physical examination of the characteristics of the items prior to purchase. As one example, after purchasing a clothing item online and receiving delivery of the clothing item, a user may find that the appearance of the clothing item does not meet his or her needs, or that the clothing item does not fit the user properly. In such a case, a user may wish to return the clothing item. In other cases, a user may order multiple colors or sizes of the same clothing item with the intention of determining a single clothing item that will fit the user properly and meet the user's needs, then returning each of the other ordered items.

In many cases, the process for returning items purchased through an online store may be laborious and inefficient. For example, a user may be required to place delivered items into their original packaging or other alternative packaging, acquire appropriate postage or other documents for shipping the item, travel to the location of a third-party shipper to relinquish the items, and in some cases, pay costs associated with this process. Additionally, the return of the items may not be processed for a significant length of time, depending on the time required for the shipper to transport the items to a facility for processing returns and the time required at the facility to verify the returned items and credit the user for the returned purchases. In some cases, a user may simply keep or destroy an unwanted item due to the cost and inconvenience of the process for returning the item. Additionally, buyers and sellers may find the purchase and return process costly and inconvenient due to the shipping costs associated with transport of items between buyers and sellers. For example, due to the unique and individualized nature of clothing items, a large number of ordered clothing items may be returned. The financial cost and the time associated with the return of each individual item or a group of items from each individual order may be significant.

Described in this disclosure are systems and methods for facilitating purchases and returns of items using a centralized location (e.g., a "trial area") where users may directly examine ordered items and initiate returns of unwanted items. For example, a user initiating a purchase or trial for one or more items using an online store may elect to have the items associated with an order delivered to a trial area rather than to the user's personal address. Shipment of items to a centralized trial area may enable sellers and online stores to transport multiple orders to a single location using a smaller number of shipments when compared to transporting individual orders to respective user addresses. In other cases, a user may elect to have the items associated with an order delivered to the user's personal address, and the user may physically transport the items to the trial area. The trial area may include a code reading device or other type of input device for controlling access to the trial area. For example, a user may scan a bar code or quick response ("QR") code associated with an item or with an order for a group of items. Continuing the example, packaging materials containing a group of items associated with an order may have a code affixed thereto. A computing device at the trial area may verify that the received code is associated with an order or an item, responsive to which access to the trial area may be granted, such as by unlocking or opening a door or other type of closure mechanism. In other implementations, an order or one or more items may be associated with a radio frequency signal device, such as a radio frequency identification (RFID) tag, or device to emit a near field communication (NFC) signal, and upon detection of a signal associated with an order, access to the trial area may be granted. In still other implementations, a user may input a user identifier, such as login credentials for a user account, and upon verification that an order is associated with the user account, access to the trial area may be granted. In other implementations, a user may be provided with an alphanumeric string or other type of passcode after completing an order, and the passcode may be input to obtain access to the trial area. Other types of input mechanisms, such as voice recognition, image recognition, biometric sensors, and the like may also be used to identify a user, an order, or an item for granting access to the trial area.

The trial area may include equipment for facilitating the examination of items. For example, a trial area associated with clothing items may include lighting, mirrors, and so forth, such that a user may wear clothing items and examine the appearance of the clothing items in a mirror. In some implementations, the trial area may also include one or more input devices and output devices. For example, the trial area may include a display device and speaker for providing output to a user, and one or more microphones, keyboards, or touch sensors for receiving user input. Continuing the example, in some implementations, a user may provide user input in the form of a voice command, keyboard input, or touch selection to modify the brightness or color of the lighting in the trial area.

The trial area may also include a container for receiving and verifying returned items. In some implementations, access to the container may be controlled using a code reading device or other type of input mechanism. For example, if a user wishes to return a clothing item, or another type of item, the user may scan a code associated with the item. Upon verification that the scanned code corresponds to an ordered item, a closure mechanism for the container may be opened. In other implementations, a user may provide input indicative of one or more items to be returned using other input devices in the trial area, such as a keyboard, touch sensor, or microphone. The container may include one or more sensors associated therewith, which may be used to verify placement of items in the container. For example, the container may include a weight sensor that determines the weight of an item placed in the container. If the weight of the item placed in the container corresponds to item data indicating an expected weight of the item to be returned, the presence of the correct item in the container may be verified. In other implementations, one or more image sensors having a field of view that includes at least a portion of the interior of the container may be used to determine visible characteristics of the item(s) within the container. For example, image data may be analyzed to determine a shape, size, color, or other characteristics of an item in the container. If the determined characteristics of the item in the container correspond to item data indicating expected characteristics of the item to be returned, the presence of the correct item in the container may be verified. In still other implementations, the container may be configured to detect radio frequency signals, such as signals emitted by an RFID tag or NFC device associated with an item. Detection of a radio frequency signal that corresponds to an item to be returned may be used to verify the presence of the correct item in the container.

In response to determination of the presence of an item in the container that corresponds to an item from the user's order, data indicative of a return of the item may be generated. In some implementations, output indicating the return may be provided to an output device, such as a display or speaker, in the trial area. In other implementations, output may be provided to a user device associated with the order, such as a smartphone or other computing device associated with the user. In some implementations, if an order includes items that are not placed into the container, data indicative of retention of the items, such as for a purchase or trial of these items, may be generated. In some cases, the data indicative of the retention may be output to an output device in the trial area or associated with the user. After a threshold count of items, a threshold weight, or a threshold volume, has been placed in the container, or after passage of a threshold length of time, a notification indicative of the container may be generated. For example, a notification may request removal or replacement of the container from the trial area. Continuing the example, a container may be removably associated with the trial area, such as by manipulating one or more attachment mechanisms, and one or more individuals may remove the container from the trial area for transport to a facility for processing returns, and replace the container with a different container. In some implementations, the container may include a first chamber that receives items from a user and a second chamber that receives items from the first chamber after sensor data has been used to verify that a correct item was placed in the first chamber. In such cases, at least the second chamber may be moveable from the trial area. Use of a centralized trial area to receive returned items from multiple orders may reduce reliance upon multiple shipments, each corresponding to an individual order. In other implementations, output indicative of placement of the item into the container may be generated without necessarily indicating a return. For example, a user selling an item may provide data indicative of the item, then place the item in a container for retrieval by another user. In such a case, rather than providing data indicative of a return, data indicative of placement of the item within the container may be provided.

In some implementations, in response to placement of an item in the container, one or more additional items may be offered for purchase or trial. For example, a user may provide user input indicating a reason for a return of an item, such as an improper size or a color that does not meet the user's needs. In response to the user input, an item having the same type or category, but a different size or color, may be determined, and data indicative of a purchase or trial of the item may be output to an output device in the trial area or an output device associated with the user. In other implementations, in response to items ordered by a user, one or more related or complementary items may be determined and data indicative of a purchase or trial of the item(s) may be provided to the user. In still other implementations one or more items may be retained in stock at a trial area. For example, common or trending items may be retained at a trial area, and data indicative of a stocked item may be provided to a user.

As one skilled in the art will appreciate in light of this disclosure, certain embodiments may be capable of achieving certain advantages, including some or all of the following: Use of a centralized location for facilitating purchases and returns of items may enable users to directly examine ordered items in situations when handling of a package containing the items would be hindered by the size or weight of the package, or in situations where a user resides in an area where loss, theft, or damage to delivered items may be possible. Additionally, use of such a location to facilitate purchases and returns may enable users to reduce shipping, postage, and packaging costs and avoid the need for travel to a facility associated with a shipper, while enabling users that are unable to easily access a shipping facility to purchase and return items from online stores. Further, verifying the return of items at a centralized location may enable a return to be processed more quickly and efficiently, and in some cases, immediately upon verification of placement of an item in a container, while also enabling new orders, purchases, and trials to be generated in response to returned items. Use of a container for receiving returned items at a centralized location may enable returns from multiple users and multiple orders to be collected and retrieved in a single shipment, rather than incurring the time and cost associated with individual shipments for each order. Additionally, use of a centralized location for scanning or otherwise receiving data indicative of items to be returned may conserve computational resources by eliminating the need to generate and transmit a user interface to a user device and receive data associated with returns of items via the user interface. For example, if a user scans a code associated with an item using a code reading device and places the item in a container, the return of the item may be handled without requiring generation of a user interface for the return of the item.

FIG. 1 depicts an implementation of a system 100 for facilitating returns of one or more items 102 associated with an order 104 by using a container 106 for receiving returned items 102 within a controlled access area 108 for examining the items 102. A user 110 may access an online store to generate an order 104 for one or more items 102, and elect for the items 102 to be delivered to a building or other type of facility associated with the controlled access area 108. For example, FIG. 1 depicts a locker 112 proximate to the controlled access area 108 that may receive delivered items 102. Continuing the example, the locker 112 and the controlled access area 108 may be physically connected. In some cases, the locker 112 may be within a controlled access area 108. In other cases, the locker 112 may be within a building or other facility that also includes a controlled access area 108. When the order 104 is delivered to the locker 112, the user 110 may receive a notification indicating the delivery and providing a code or other method for accessing the locker 112. In other implementations, a user 110 may elect for the order 104 to be delivered to another location, such as the user's 110 personal address, or the user 110 may acquire the items at a physical location, and the user 110 may transport one or more items 102 to the controlled access area 108.

Access to the controlled access area 108 may be controlled using a closure mechanism 114(1), such as a door associated with a code reading device (e.g., code reader 116(1)). The closure mechanism 114(1) may prevent access to the controlled access area 108 until a code or other type of input is provided to the code reader 116(1). In some implementations, the order 104 may be associated with an order code 118. For example, a box or other type of packaging that contains the items 102 associated with the order 104 may have a bar code, a QR code, or another type of scannable code affixed thereto. Upon scanning the order code 118, the code reader 116(1) may provide code data 122(1) indicative of the order code 118 to a control server 120. The control server 120 may verify that the order code 118 corresponds to an order 104 that was delivered proximate to the controlled access area 108 and upon successful verification of the order code 118, may provide control data 124 to cause the closure mechanism 114(1) to open and grant access to the controlled access area 108. In other implementations, other types of input may be used to provide access to the controlled access area 108. For example, one or more items 102 associated with the order 104 may have an associated item code 126 that may be scanned using the code reader 116(1). The control server 120 may determine that the scanned item code 126 is associated with a valid order 104. As another example, the user 110 may receive a passcode, such as an alphanumeric string, and may provide the passcode to obtain access to the controlled access area 108. As yet another example, a user 110 may provide user data, such as by using an input device associated with the controlled access area 108 to provide login credentials for a user account associated with the order 104. As another example, a user 110 may provide biometric data, such as a fingerprint, or a camera or other type of image sensor may acquire an image of the user 110 which may be used to identify the user 110 and verify that the user 110 is associated with the order 104. In some cases, in addition to or in lieu of using a code reader 116(1) or other input device associated with the controlled access area 108, the user 110 may provide input to access the controlled access area 108 using a user device associated with the user 110, such as a smartphone or other type of portable computing device. For example, a bar code, QR code, or other type of identifiable code or signal may be provided to the user device, then detected when the user 110 approaches the controlled access area 108. As another example, a portable computing device associated with the user 110 may be detected when the user device accesses a network associated with the control sever 120, such as via one or more wireless access points associated with the controlled access area 108. In some implementations, if input other than a code associated with the order 104 or items 102 is used to enter the controlled access area 108, the items 102 associated with the order 104 may be delivered to an area inside the controlled access area 108 rather than to a locker 112 or other area external to the controlled access area 108.

In some implementations, a controlled access area 108 may include one or more features for providing security and safety of users 110. For example, a controlled access area 108 or a facility that includes one or more controlled access areas 108 may include interior or exterior lighting, interior or exterior security cameras, security personnel, an alarm button or other feature for summoning security personnel located on the interior or exterior of a controlled access area 108, and so forth. In some cases, a user 110 may request particular security features when purchasing one or more items 102 from an online store. For example, a user 110 may select for an order 104 to be delivered to a locker 112 located at a facility having an on-site security guard.

Once access to the controlled access area 108 has been granted to the user 110, the user 110 may enter the controlled access area 108 to examine the items 102. For example, the controlled access area 108 may include one or more mirrors 128, lights 130, physical structures for hanging or placing items 102, areas for sitting or standing, and so forth, to facilitate examination of the items 102 by the user 110. In some implementations, user input may be used to control one or more features within the controlled access area 108. For example, a microphone, keyboard, touch sensor, or other type of input device associated with the controlled access area 108 may be used to control the color or brightness of the lights 130. Continuing the example, responsive to a voice command by the user 110 to modify the lighting in the controlled access area 108 to simulate outdoor lighting, candlelight, fluorescent lighting, or other types of lighting, the control server 120 or another computing device in communication with the light(s) 130 may control the output of the light(s) 130. The controlled access area 108 may also include one or more output devices 132 that may be used to present output to a user 110 within the controlled access area 108. For example, FIG. 1 depicts a first output device 132(1) as a display device and a second output device 132(2) as a speaker. Continuing the example, in response to a voice command, keyboard input, or touch sensor input from the user 110, the control server 120 or another computing device in communication with the output device(s) 132 may cause the second output device 132(2) to output selected audio or the first output device 132(1) to output selected images or video. In some implementations, a user 110 may configure the controlled access area 108 to provide a selected level of privacy. For example, a user 110 may provide a command to disable one or more input devices or output devices 132 within the controlled access area 108 or to opt out of use of any of the input or output devices 132. As another example, a user 110 may request that an order 104 be delivered to a location in which a controlled access area 108 lacks particular types of input or output devices 132.

As the user 110 examines the items 102 within the controlled access area 108, the user 110 may select to return one or more of the items 102. For example, the items 102 may include clothing items, and the user 110 may determine that one or more of the items 102 does not fit properly. A container 106 within the controlled access area 108 may be configured to receive returned items 102. For example, a container 106 may be removably attached to a wall of the controlled access area 108, and access to the container 106 may be controlled via a closure mechanism 114(2), such as a door or panel. A code reading device (e.g., code reader 116(2)) or other type of input device within the controlled access area 108 may be used to receive input for accessing the container 106. For example, the code reader 116(2) may be used to scan an item code 126 for a particular item 102 and provide code data 122(2) indicative of the item code 126 to the control server 120. The control server 120 may determine that the item code 126 corresponds to an item 102 within the order 104 and provide control data 124 to cause the closure mechanism 114(2) to open. In other implementations, other types of user input indicative of a particular item 102 or indicative of the user 110 may be provided to an input device in the controlled access area 108 to cause the closure mechanism 114(2) to open. For example, the user 110 may provide access credentials associated with a user account using an input device within the controlled access area 108. Output indicating one or more items 102 associated with the order 104 may be provided using one or more of the output devices 132 or a user device associated with the user 110. The user 110 may then select an item 102 to be placed in the container 106.

After access to the container 106 has been granted, the user 110 may place an item 102 in the container 106. One or more sensors 134 associated with the container 106 may determine characteristics of the item 102 and provide sensor data 136 indicative of the characteristics to the control server 120. In one implementation the sensor(s) 134 may include a weight sensor that may determine a weight of the item 102 in the container 106. The control server 120 may compare the weight indicated by the sensor data 136 with an expected weight of the item 102 to validate that an item 102 having the correct weight was placed in the container 106. In other implementations, the sensor(s) 134 may include a camera or other type of image sensor having a field of view that includes at least a portion of the interior of the container 106. The camera may be positioned such that only the interior of the container 106 is within the field of view of the camera, and the field of view excludes the interior of the controlled access area 108. Image data generated by the sensor(s) 134 may be used to determine characteristics of the item 102 in the container 106, such as a color, size, shape, or other visible characteristics. The control server 120 may compare the determined characteristics with one or more expected characteristics of the item 102 to validate that an item having the correct characteristics was placed in the container 106. In still other implementations, the sensor(s) 134 may include a device for detecting radio frequency signals, such as an RFID tag or NFC device associated with the item 102. The control server 120 may determine correspondence between the detected radio frequency signal and an expected radio frequency signal associated with the item 102.

In some implementations, the container 106 for receiving returned items 102 may include the locker 112 in which the items 102 were delivered, or the container 106 may be configured to transport returned items 102 to the locker 112. In one example, the locker 112 may include adjustable partitions that may be adjusted based on sizes of items 102 placed within the locker 112, to maximize the number of items 102 that may be stored while reducing unused space. Partitions within a locker 112 or other type of storage area may be positioned (e.g., inserted, moved, removed) using partition positioning elements (e.g., rollers, motors, actuators, robotic arms) for configuring the sizes of different compartments within the locker 112. One such example of a storage area is described in U.S. Pat. No. 9,745,130, which is incorporated by reference herein in its entirety.

After verifying that the correct item 102 was placed in the container 106 using the sensor data 136, data indicative of a return of the item 102 may be generated and provided to an output device 132 within the controlled access area 108 or a user device associated with the user 110. For example, output indicating a return of the item 102 may be provided to a display device in the controlled access area 108 or audibly output using a speaker. In some implementations, when the user 110 exits the controlled access area 108 or when the user 110 provides user input indicating that the user 110 has finished examining the items 102, data indicative of a purchase or trial of any items 102 associated with the order 104 that were not placed in the container 106 may be generated. The data may be provided to a user device associated with the user 110 or to an output device 132 associated with the controlled access area 108.

Figure 2:
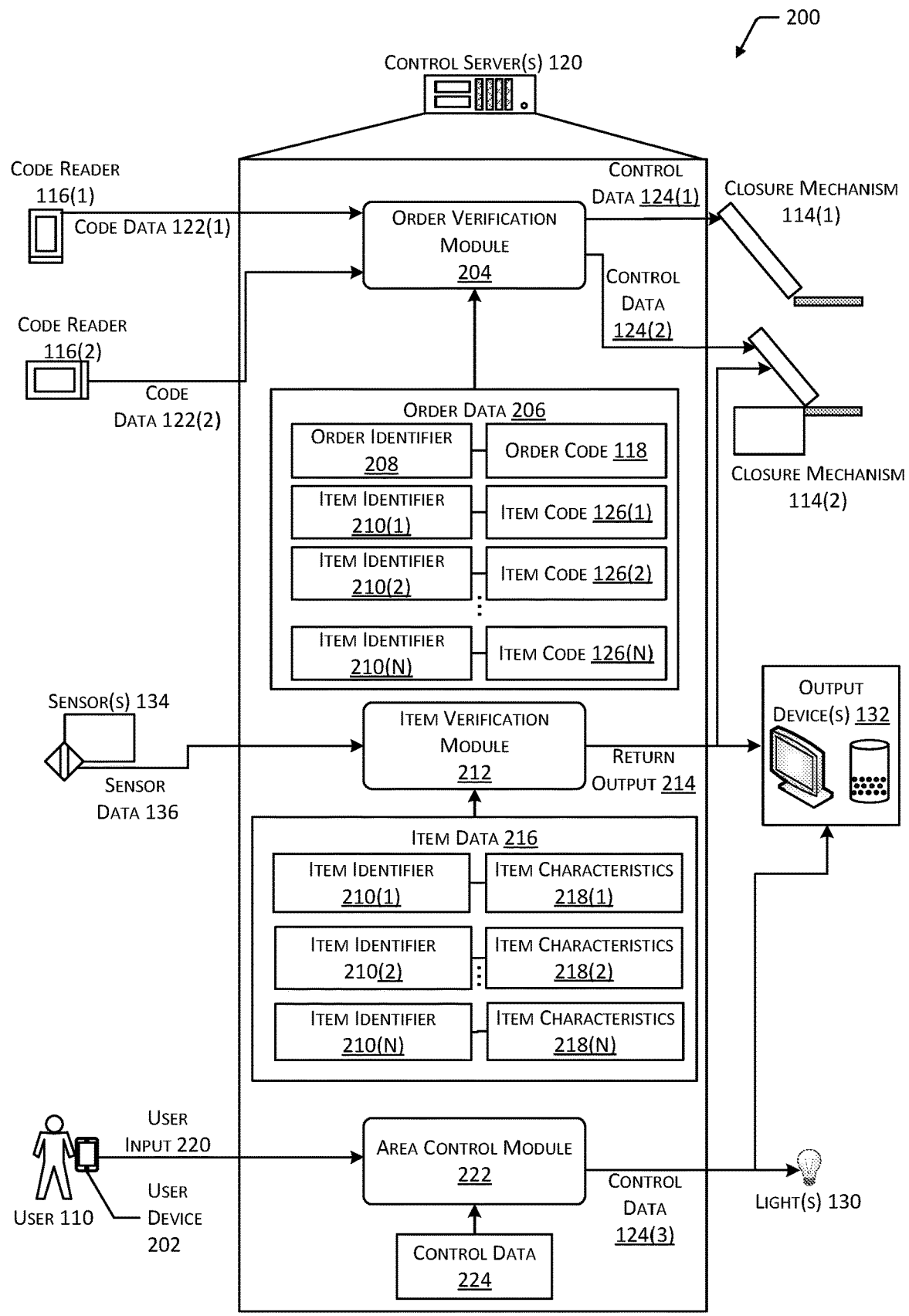
FIG. 2 is a diagram depicting an implementation of a control server that may be used to facilitate returns of items.

FIG. 2 is a diagram 200 depicting an implementation of a control server 120 that may be used to facilitate returns of items 102. As described with regard to FIG. 1, one or more control servers 120 may receive data from code readers 116, sensors 134, user devices 202, or other types of input devices. In response to the received data, the control server(s) 120 may provide control data 124 or other types of output to closure mechanisms 114, lights 130, output devices 132, user devices 202, or other elements associated with a controlled access area 108. While FIGS. 1 and 2 depict a single control server 120 for illustrative purposes, any number and any type of computing devices may be used to send and receive data associated with the controlled access area 108 including, without limitation, servers, personal computing devices, portable computing devices, automotive computing devices, wearable computing devices, set top boxes, smartphones, and so forth.

An order verification module 204 associated with the control server(s) 120 may be used to control access to the controlled access area 108 and to a container 106 for receiving returned items 102 within the controlled access area 108. The order verification module 204 may receive code data 122 from one or more code readers 116 associated with the controlled access area 108. For example, as described with regard to FIG. 1, a first code reader 116(1) external to the controlled access area 108 may be used to scan an order code 118 associated with an order 104 or an item code 126 associated with an item 102. The code reader 116(1) may generate code data 122(1) indicative of the scanned code and provide the code data 122(1) to the control server(s) 120. The order verification module 204 may determine correspondence between the code represented by the code data 122(1) and order data 206 that may associate orders 104 with corresponding order codes 118 and items 102 with corresponding item codes 126. For example, FIG. 2 depicts the order data 206 associating an order identifier 208, such as an order name, alphanumeric string, user identifier associated with the order 104, or other type of data indicative of an order 104, with a corresponding order code 118. The order data 206 is also depicted associating a first item identifier 210(1) corresponding to a first item 102 with a first item code 126(1) and a second item identifier 210(2) corresponding to a second item 102 with a second item code 126(2). An order 104 may include any number of items 102, ranging from a single item 102 to a large number of items 102, and as such, the order data 206 may associate any number of item identifiers 210(N) with any number of corresponding item codes 126(N). Additionally, while FIG. 2 depicts the order data 206 representing a single order 104, the order data 206 may indicate order identifiers 208 and corresponding order codes 118, item identifiers 210, and item codes 126 for any number of orders.

If the code data 122(1) received from the code reader 116(1) corresponds to an order code 118 or item code 126(1) indicated in the order data 206, this correspondence may indicate that the order 104 or item 102 associated with a scanned code relates to an active order 104 that was delivered proximate to the controlled access area 108 or is otherwise authorized to be examined in the controlled access area 108. Based on this correspondence, the order verification module 204 may generate control data 124(1) to cause a closure mechanism 114(1) that controls access to the controlled access area 108 to open. In other implementations, other types of input may be used to obtain access to the controlled access area 108 in addition to or in lieu of the code data 122(1). For example, a user 110 may provide a passcode, access a user account, provide an image or biometric data, or other types of data that may be used to verify a user 110, an order 104, or an item 102 that is authorized for access to the controlled access area 108.

The order verification module 204 may also receive code data 122(2) from a code reader 116(2) within the controlled access area 108, such as responsive to an item code 126 scanned by a user 110. For example, if a user 110 wishes to return an item 102, the user 110 may scan the item code 126 associated with the item 102 using the code reader 116(2). The code reader 116(2) may generate code data 122(2) indicative of the item code 126, which may be transmitted to the control server(s) 120. The order verification module 204 may determine correspondence between the order data 206 and the item code 126, and based on this correspondence, may generate control data 124(2) to cause the closure mechanism 114(2) associated with the container 106 to open. In other implementations, other types of input may be used to identify an item 102, such as user selection of items 102 from a display or other output device 132, image data representing an image of an item 102 to be returned, data representing an item 102 that is input using an input device within the controlled access area 108, and so forth.

An item verification module 212 associated with the control server(s) 120 may determine whether items 102 having particular characteristics are placed in the container 106 prior to generating return output 214 indicative of a return of an item 102. For example, as described previously, a closure mechanism 114(2) associated with a container 106 for receiving returned items 102 may be opened in response to code data 122(2) that corresponds to an item 102 within an order 104. One or more sensors 134 may be associated with the container 106. Sensors 134 may include weight sensors, image sensors, RFID sensors, NFC sensors, or other types of sensors that may detect one or more characteristics of an item 102 within the container 106. The item verification module 212 may determine correspondence between sensor data 136 received from one or more sensors 134 and item data 216 that associates particular items 102 with corresponding sets of item characteristics 218. For example, FIG. 2 depicts the item data 216 associating a first item identifier 210(1) with a first set of item characteristics 218(1) and a second item identifier 210(2) with a second set of item characteristics 218(2). While FIG. 2 depicts the item data 216 representing two items 102, the item data 216 may include any number of item identifiers 210(N) associated with any number of corresponding sets of item characteristics 218(N). Example item characteristics 218 may include an expected weight of an item 102, a color of an item 102, a shape of an item 102, an RFID code associated with an RFID tag attached to the item 102, a radio frequency signal associated with the item that may be detected using an RFID or NFC device, and so forth. For example, a weight sensor associated with the container 106 may determine a weight of an item 102 within the container 106, and the item verification module 212 may determine correspondence between sensor data 136 indicative of the measured weight and item characteristics 218 indicative of an expected weight of the item 102. As another example, an image sensor having a field of view that includes at least a portion of the interior of the container 106 may determine sensor data 136, such as image data from which a color, shape, or other visible characteristics of an item 102 may be determined. The item verification module 212 may determine correspondence between this sensor data 136 and item characteristics 218 indicative of expected visible characteristics of the item 102. As yet another example, the sensor data 136 may include a radio frequency signal or code determined from the item 102, and the item data 216 may indicate an expected radio frequency signal or code.

If the item data 216 corresponds to the sensor data 136, the item verification module 212 may cause return output 214 indicative of a return of the item 102 to be generated and provided to an output device 132. Output devices 132 may include displays or speakers associated with the controlled access area 108 or a user device 202 associated with the user 110. If the item data 216 does not correspond to the sensor data 136, the return output 214 may indicate that data indicative of a return of the item 102 has not been generated. In some implementations, the closure mechanism 114(2) for the container 106, or an alternate closure mechanism 114 associated with the container 106, may be caused to open, and the return output 214 may include a request that an incorrect item 102 be removed from the container 106. In some cases, the incorrect item 102 placed in the container 106 may be identified based on correspondence between the determined sensor data 136 and the item data 216, and the return output 214 may include a prompt indicating the item 102 that was placed in the container 106 and requesting confirmation that return of the indicated item 102 is desired.

Other data received by the control server(s) 120 may include user input 220 provided by the user 110 using one or more input devices associated with the controlled access area 108 or a user device 202 associated with the user 110. For example, the user input 220 may include one or more commands requesting manipulation of one or more features of the controlled access area 108. Continuing the example, the user input 220 may include a request to modify the color or brightness of one or more lights 130 in the controlled access area 108, a request to modify music or other ambient sounds emitted by a speaker in the controlled access area 108, or a request to modify images or videos output by a display in the controlled access area 108. An area control module 222 associated with the control server(s) 120 may determine correspondence between the user input 220 and control data 224 indicative of one or more modifications to the controlled access area 108 that correspond to different user input 220. The area control module 222 may generate control data 124(3) based on this correspondence, which may be used to control one or more lights 130, displays, speakers, or other output devices 132 associated with the controlled access area 108.

Figure 3:
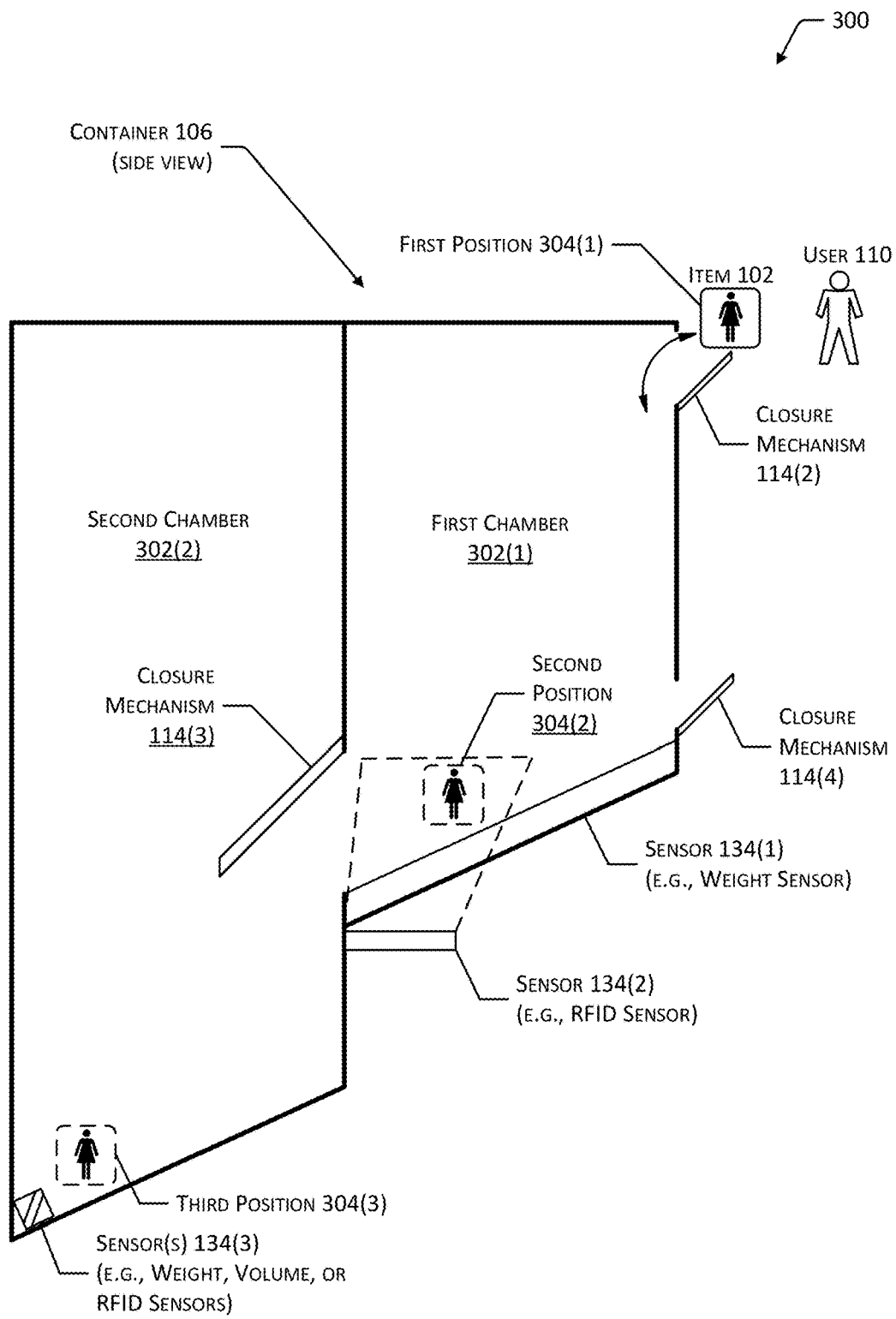
FIG. 3 is a diagram depicting an implementation of a container that may be used to facilitate returns of items.

FIG. 3 is a diagram 300 depicting an implementation of a container 106 that may be used to facilitate returns of items 102. As described with regard to FIGS. 1 and 2, a container 106 may be positioned in association with a controlled access area 108 to enable a user 110 to examine items 102 within the controlled access area 108, such as by wearing clothing items to determine a proper fit, color, and so forth. If a user 110 wishes to return an item 102, the user 110 may scan a code associated with the item 102 or provide another type of input indicative of the item 102, responsive to which a closure mechanism 114(2) for the container 106 may be caused to open. For example, the container 106 may be engaged to a wall of the controlled access area 108, and the closure mechanism 114(2) may include a panel, door, drawer, or other type of movable element that movably covers an opening between the interior of the container 106 and the exterior.

In some implementations, as depicted in FIG. 3, the container 106 may include a first chamber 302(1) proximate to the closure mechanism 114(2), and a second chamber 302(2) farther from the closure mechanism 114(2). The first chamber 302(1) and the second chamber 302(2) may be separated by an additional closure mechanism 114(3). One or more sensors 134 may be associated with the first chamber 302(1), enabling the first chamber 302(1) to function as a section of the container 106 used for verification of items 102. For example, FIG. 3 depicts the first chamber 302(1) including a first sensor 134(1), such as a weight sensor for determining the weight of items 102 that are placed in the first chamber 302(1), and a second sensor 134(2), such as an RFID sensor for detecting RFID tags associated with items 102 placed in the first chamber 302(1). The closure mechanism 114(3) between the first chamber 302(1) and the second chamber 302(2) may be controlled by the control server(s) 120. For example, if sensor data 136 generated by the sensors 134 corresponds to item data 216 indicative of the item 102 placed in the first chamber 302(1), the closure mechanism 114(3) may be opened to allow the item 102 to pass from the first chamber 302(1) into the second chamber 302(2) for storage. If the sensor data 136 does not correspond to item data 216 indicative of the item 102, such as if an incorrect item 102 is placed in the first chamber 302(1), the closure mechanism 114(2) may be opened and a notification may be generated instructing the user 110 to remove the item 102 from the container 106. In some implementations, items 102 placed in the first chamber 302(1) may be out of reach of the user 110. In such a case, the container 106 may include an additional closure mechanism 114(4) located in a position that permits access to the item 102 within the first chamber 302(1). If the sensor data 136 does not correspond to the item data 216 indicative of the item 102, the closure mechanism 114(4) may be opened to permit the user 110 to access the item 102 for removal from the first chamber 302(1).

For example, a user 110 may scan a code associated with an item 102 or provide other input indicative of an item 102 to cause the closure mechanism 114(2) to open. The user 110 may then pass the item 102 from a first position 304(1) external of the container 106 to a second position 304(2) within the first chamber 302(1). While the item 102 is within the first chamber 302(1), the first sensor 134(1), the second sensor 134(2), and any additional sensors 134 associated with the first chamber 302(1) may generate sensor data 136 indicative of characteristics of the item 102. The sensor data 136 may be provided to the control server(s) 120 to verify that an item 102 having characteristics that correspond to those of the item 102 for which the code or other input was provided has been placed within the first chamber 302(1). If the item data 216 does not correspond to the sensor data 136, the closure mechanism 114(2) may be caused to open and the user 110 may be requested to remove the item 102. If the item data 216 corresponds to the sensor data 136, the closure mechanism 114(3) may be caused to open to allow the item 102 to move to a third position 304(3) within the second chamber 302(2). The second chamber 302(2) may contain multiple items that have passed through the first chamber 302(1), enabling the first chamber 302(1) to be used to verify individual items 102 or sets of items 102, while the second chamber 302(2) is used to store verified items 102.

In some implementations, one or more additional sensors 134(3) associated with the second chamber 302(2) may generate sensor data 136 indicative of a total weight, volume, or quantity of items within the second chamber 302(2). For example, if a total weight, volume, or quantity indicated by the sensors 134(3) exceeds a threshold value, a notification indicative of the container 106 may be generated. Continuing the example, the notification may request emptying or replacement of the container 106. In some implementations, the second chamber 302(2) may be removable from the first chamber 302(1) to enable transport of the second chamber 302(2) to a facility for processing of the returned items. A replacement second chamber 302(2) may be engaged with the first chamber 302(1) when the second chamber 302(2) is removed for transport. In other implementations, the entire container 106 may be removable from the controlled access area 108 for transport and a replacement container 106 may be engaged with the controlled access area 108 when the original container 106 is removed for transport.

In some implementations, a controlled access area 108 may have multiple containers 106 associated therewith, or a single first chamber 302(1) may have multiple second chambers 302(2) associated therewith. For example, a first container 106 may be used to store delicate clothing items while a second container 106 is used to store shoes and a third container 106 is used to store jewelry. When an item code 126 or other data indicative of an item 102 is scanned, a type or category associated with the item may be determined, such as by determining correspondence between the item code 126 and item data 216 indicative of an item type or category. Based on the determined item type or category, a container 106 that corresponds to the particular item type or category may be opened. For example, accepting returned clothing items in a separate container 106 from returned shoes may reduce the likelihood of damage to the clothing items while also facilitating more efficient processing of returns due to the sorting of items 102 by type or category. As another example, a first chamber 302(1) may receive multiple types of items 102, but different closure mechanisms 114(3) may be used to control access between the first chamber 302(1) and different second chambers 302(2). Each second chamber 302(2) may be used to store a different type of item 102. Thus, based on the determined item type or category, a corresponding closure mechanism 114(3) may be opened to pass the item 102 into a corresponding second chamber 302(2). An example of such a container 106 is shown in FIG. 4.

Additionally, in some implementations, a container 106 may be configured to retain items 102 in the first chamber 302(1) proximate to the closure mechanism 114(2) to enable users 110 to remove items 102 from the container 106. In such cases, the container 106 may permit items 102 to pass into the second chamber 302(2) after a user 110 has completed use of the controlled access area 108. For example, a user 110 may reconsider returning an item 102 and wish to remove the item 102 from the container 106.

Figure 4:
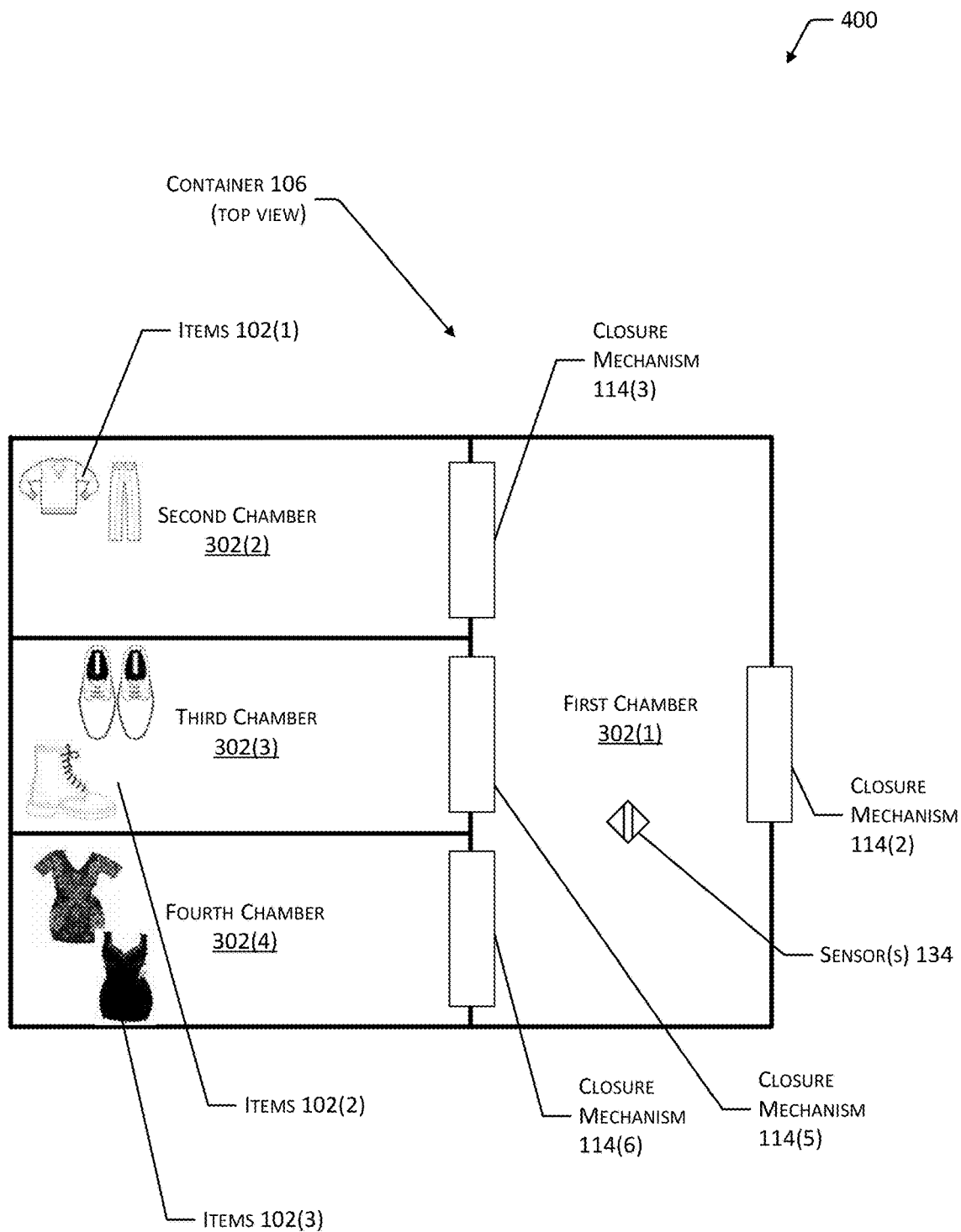
FIG. 4 is a diagram depicting an implementation of a container that may be used to facilitate returns of multiple types of items into respective separate chambers.

FIG. 4 is a diagram 400 depicting an implementation of a container 106 that may be used to facilitate returns of multiple types of items 102 into respective separate chambers 302. As described with regard to FIG. 3, a container 106 may include a first chamber 302(1) separated from an exterior of the container 106 by a closure mechanism 114(2). In some implementations, one or more additional closure mechanisms 114(4) may also separate the first chamber 302(1) from the exterior to facilitate removal of incorrect items 102 from the first chamber 302(1). The first chamber 302(1) may also be separated from a second chamber 302(2), a third chamber 302(3), and a fourth chamber 302(4) within the container 106, each chamber 302 being configured to retain items 102 having a particular category or particular material characteristics. For example, the second chamber 302(2) may contain clothing items 102(1), the third chamber 302(3) may contain footwear items 102(2), and the fourth chamber 303(4) may include delicate items 102(3). Separation of the items 102 into different chambers 302 may prevent damage to items 102. For example, contact between winter boots and a silk dress within the same chamber 302 may cause damage to the silk dress.

The first chamber 302(1) may be separated from the second chamber 302(2) by a closure mechanism 114(3), from the third chamber 302(3) by a closure mechanism 114(5), and from the fourth chamber 302(4) by a closure mechanism 114(6). When sensor data 136 from one or more sensors 134 in the first chamber 302(1) is used to verify that the item 102 within the first chamber 302(1) includes one or more expected item characteristics 218, the item data 216 may also be used to determine which of the closure mechanisms 114 to open to enable passage of the item 102 into one of the second chamber 302(2), third chamber 302(3), or fourth chamber 302(4). For example, the item data 216 for the item 102 within the first chamber 302(1) may be used to determine a type or category associated with the item 102, such as whether the item 102 includes footwear or clothing, or one or more material characteristics of the item 102, such as whether the item is made from silk or another delicate material. Based on the item data 216 for the item 102, a closure mechanism 114 associated with a chamber 302 suitable for containing the item 102 may be caused to open. For example, delicate items 102 may be placed in a chamber 302 separate from footwear items 102. As other examples, items 102 may be sorted by category, by weight, by dimensions, and so forth.

In some implementations, the position of interior walls within the container 106 may be reconfigurable to change the size of one or more of the chambers 302. For example, the size of each chamber 302 may be adjusted based on the number, type, and sizes of items 102 to be placed in each chamber 302. For example, U.S. Pat. No. 9,745,130, incorporated by reference previously, describes a locker 112 or other type of storage area that includes adjustable partitions for changing the size of interior compartments to reduce unused space and increase the number of stored items 102.

Figure 5:
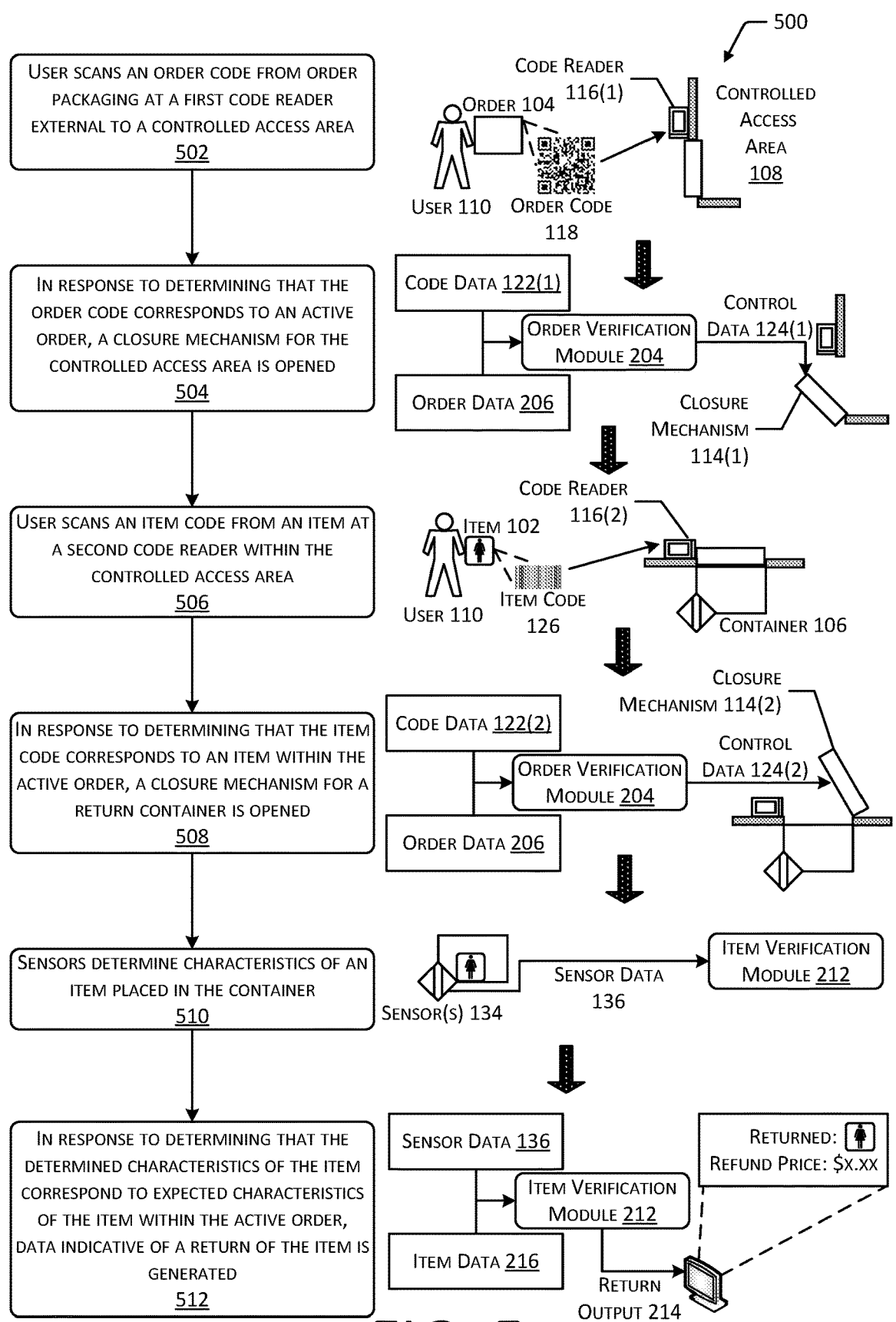
FIG. 5 is a scenario depicting a method for facilitating returns of items by a user within a controlled access area that includes a container for accepting returned items.

FIG. 5 is a scenario 500 depicting a method for facilitating returns of items 102 by a user 110 within a controlled access area 108 that includes a container 106 for accepting returned items 102. At 502, a user 110 may scan an order code 118 from the packaging for an order 104 at a first code reader 116(1) that is located external to a controlled access area 108. For example, as described previously with regard to FIG. 1, an order 104 may include one or multiple items 102 that may be delivered in one or more sets of packaging materials. The packaging for an order 104 may have a code associated therewith, such as a bar code or a QR code. In other implementations, an order 104 may be accompanied by or associated with a passcode that may be input by the user 110 at an input device external to the controlled access area 108. In still other implementations, a user 110 may provide information associated with a user account, a code or other data indicative of a particular item 102, or other data indicative of the user 110, the order 104, or an item 102 associated with the order 104.

At 504, in response to determining that the order code 118 corresponds to an active order 104, a closure mechanism 114(1) for a controlled access area 108 may be opened. For example, an order verification module 204 associated with one or more control servers 120 may receive code data 122(1) from a code reader 116(1) that is indicative of the scanned order code 118. As described with regard to FIG. 2, the order verification module 204 may determine correspondence between the code data 122(1) and order data 206 that associates order codes 118 with orders 104. In other implementations, the order data 206 may associate other types of input, such as user passcodes or user accounts, with corresponding orders 104. If the code data 122(1) or other type of input corresponds to the order data 206, the order verification module 204 may generate control data 124(1) to cause the closure mechanism 114(1) to open to grant access to the controlled access area 108. In some implementations, if the code data 122(1) does not correspond to the order data 206, the control data 124(1) may instead cause an output indicating that access to the controlled access area 108 is not granted.

At 506, a user 110 within the controlled access area 108 may scan an item code 126 from an item 102 at a second code reader 116(2) within the controlled access area 108. For example, at least a portion of the items 102 associated with an order 104 may have item codes 126 affixed thereto or otherwise associated therewith. In other implementations, an item 102 may be associated with an RFID tag or a radio frequency signal generator that may be detected by a second code reader 116(2) or other type of input device. In still other implementations, in lieu of or in addition to an item code 126, a user 110 may provide other data indicative of a particular item 102, such as an item name or other identifier, selection of an item 102 from a displayed list of items 102, and so forth.

At 508, in response to determining that the item code 126 corresponds to an item 102 within the active order 104, a closure mechanism 114(2) for a return container 106 may be opened. For example, as described with regard to FIG. 2, an order verification module 204 may determine correspondence between the item code 126, or another type of input indicative of an item 102, and order data 206 that associates item codes 126 or other input with particular items 102. If the item code 126 or other input corresponds to the order data 206, the order verification module 204 may generate control data 124(2) to cause the closure mechanism 114(2) to open. In some implementations, if the input does not correspond to the order data 206, the control data 124(2) may cause an output indicating that access to the container 106 is not granted.

At 510, sensors 134 may determine characteristics of an item 102 placed in the container 106. For example, after the closure mechanism 114(2) is opened, a user 110 may place an item 102 in the container 106 to initiate a process to return the item 102. The container 106 may include one or more weight sensors, image sensors, RFID sensors, NFC sensors, or other types of sensors that may determine characteristics of items 102 within the container 106. For example, a weight sensor may determine a weight of the item 102 within the container 106, an image sensor may determine a color, size, or shape of the item 102, and an RFID sensor may detect a signal emitted by an RFID tag associated with the item 102. The sensor(s) 134 may generate sensor data 136 indicative of the determined characteristics of the item 102, which may be provided to an item verification module 212 associated with the control server(s) 120.

At 512, in response to determining that the determined characteristics of the item 102 correspond to expected characteristics of the item 102 within the active order 104, data indicative of a return of the item 102 may be generated. For example, the item verification module 212 may determine correspondence between the sensor data 136 and item data 216 that associates particular items 102 with expected item characteristics 218. Continuing the example, the item data 216 may indicate an expected weight for a particular item 102 for which a code was received from the code reader 116(2). If the weight indicated by the sensor data 136 matches the expected weight of the item 102, the item verification module 212 may generate a return output 214 indicative of a return of the item 102. In some implementations, if the sensor data 136 does not correspond to the item data 216, output indicating the lack of correspondence may be generated. For example, a user 110 may be requested to remove an incorrect item 102 from the container 106, or if the item 102 that was placed in the container 106 may be identified, output identifying the item 102 and requesting verification from the user 110 for return of the item 102 may be generated.

Figure 6:
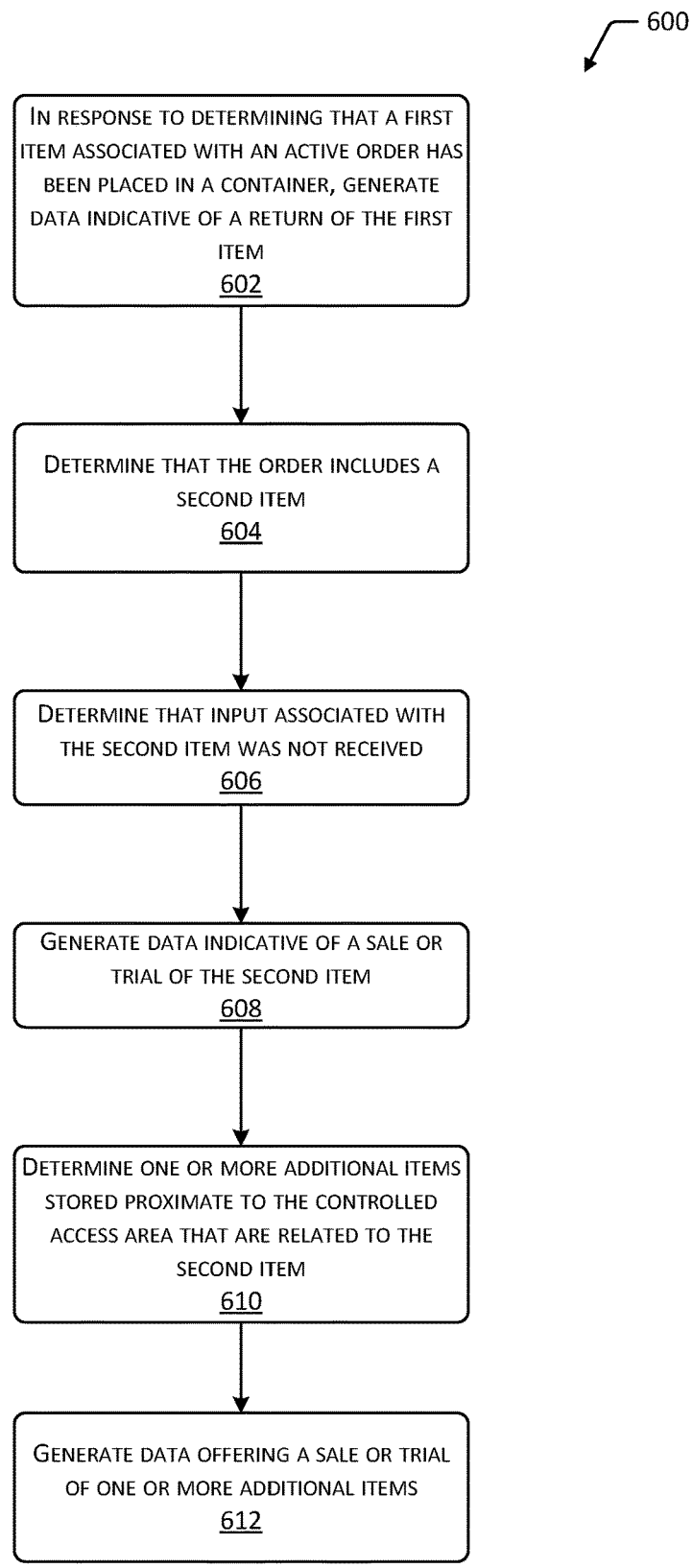
FIG. 6 is a flow diagram illustrating a method for determining a purchase or trial of one or more items based on data received from a user's use of a controlled access area to return items.

FIG. 6 is a flow diagram 600 illustrating a method for determining a purchase or trial of one or more items 102 based on data received from a user's 110 use of a controlled access area 108 to return items 102. At 602, in response to determining that a first item 102 associated with an active order 104 has been placed in a container 106, data indicative of a return of the first item 102 may be generated. One example process for facilitating the return of an item 102 using data determined from placing the item 102 in a container 106 is described with regard to FIG. 5.

At 604, a determination may be made that the order 104 includes a second item 102. At 606, a determination may be made that input associated with the second item 102 was not received. For example, an order 104 may include any number of items 102, ranging from a single item 102 to a large number of items 102. While a user 110 may scan a code associated with a particular item 102 or multiple items 102 and may place one or more items 102 in a container 106 to facilitate return of the items 102, in some cases, codes corresponding to every item 102 associated with an order 104 may not be received. For example, if a user 110 examines multiple items 102 and chooses to return only a portion of the items 102, the user 110 may not scan codes associated with the items 102 that the user 110 does not wish to return.

At 608, data indicative of a sale or trial of the second item 102 may be generated. For example, some merchants may choose to permit users 110 to examine items 102 prior to completing a purchase or initiating a trial of the items 102. In such cases, after determining the particular items 102 within an order 104 that were not returned, a purchase or a trial of these items 102 may be initiated after a user 110 completes use of the controlled access area 108 for examining and returning items 102.

At 610, one or more additional items 102 stored proximate to the controlled access area 108 that are related to the second item 102 may be determined. For example, an indication of particular items 102 that are common, popular, or otherwise retained in stock at or near the controlled access area 108 may be stored as stock data. Correspondence between characteristics of an item 102 that was purchased or retained by a user 110 and the stock data may be used to determine one or more additional items 102 stored proximate to the controlled access area 108 that may be of relevance to the user 110.

At 612, data offering a sale or trial of one or more additional items 102 may be generated. For example, when a user 110 indicates that the user 110 has completed use of the controlled access area 108 to examine items 102, the particular items 102 that were retained by the user 110 may be determined. Then, one or more additional items 102 stored proximate to the controlled access area 108 that are related to the items 102 retained by the user 110 may be determined and offered for purchase or trial.

Figure 7:
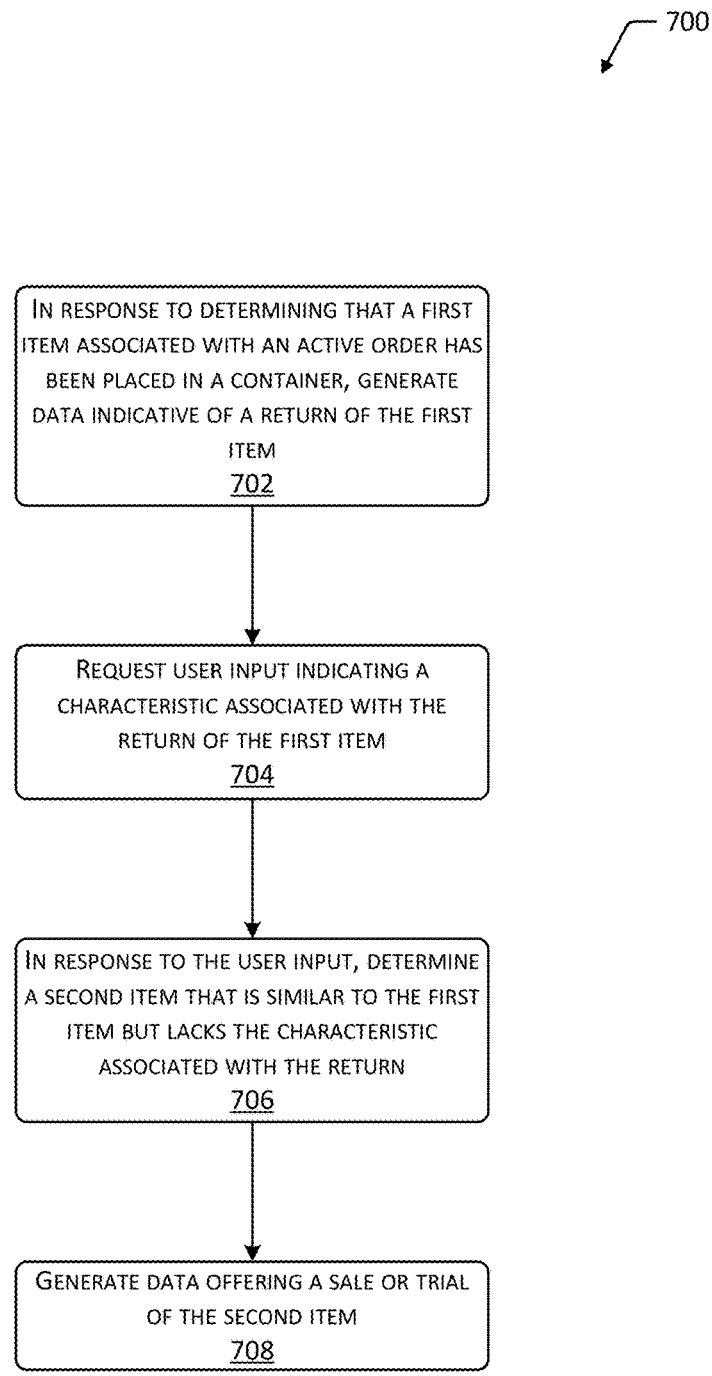
FIG. 7 is a flow diagram illustrating a method for facilitating a purchase or trial of one or more additional items based on the characteristics of one or more items returned by a user.

FIG. 7 is a flow diagram 700 illustrating a method for facilitating a purchase or trial of one or more additional items 102 based on the characteristics of one or more items 102 returned by a user 110. At 702, in response to determining that a first item 102 associated with an active order 104 has been placed in a container 106, data indicative of a return of the first item 102 may be generated. One example process for facilitating the return of items 102 using data determined from a container 106 is described with regard to FIG. 4.

At 704, user input indicating a characteristic associated with the return of the first item 102 may be requested. For example, a user 110 may determine that a particular clothing item 102 does not fit properly or that the color of the clothing item 102 is not suitable. In response to the request for user input, the user 110 may indicate that the item 102 was too large, too small, the color of the item 102 was too bright or dark, or other characteristics of the item 102 that were unsuitable.

At 706, in response to the user input, a second item 102 may be determined that is similar to the first item 102 but lacks the characteristic associated with the return. At 708, data offering a sale or trial of the second item 102 may be generated. For example, if a user 110 indicates that a clothing item 102 is too large or that the color is not suitable, an identical item 102 provided by the same manufacturer, but having a different size or color, may be determined and offered for sale or trial. As another example, if a user 110 indicates that the cut or material of a clothing item 102, such as a jacket, is not suitable, a similar item 102 having the same category but different characteristics may be determined, such as a jacket made by a different manufacturer from a different material.

Figure 8:
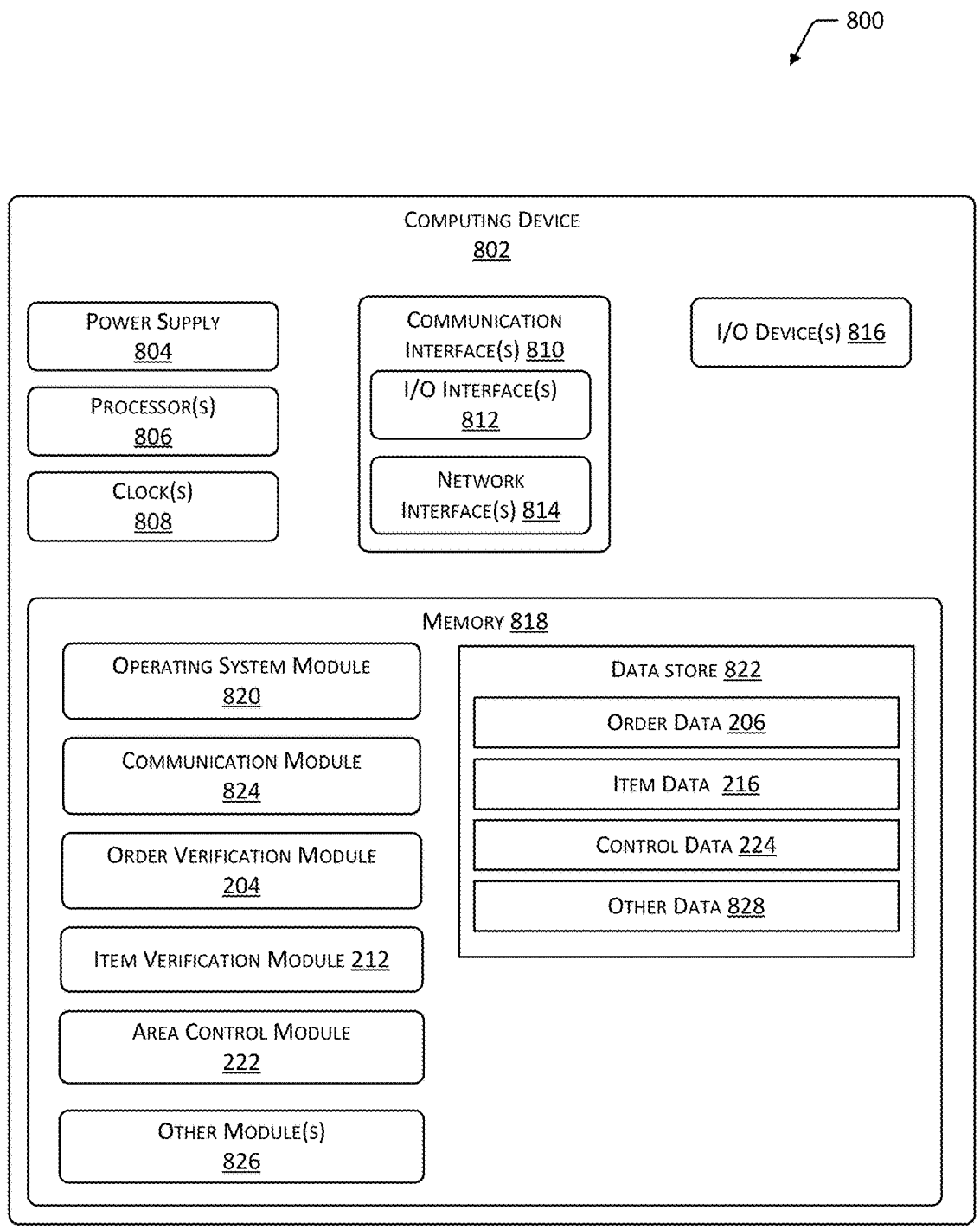
FIG. 8 is a block diagram depicting a computing device within the scope of the present disclosure.

FIG. 8 is a block diagram 800 depicting a computing device 802 within the scope of the present disclosure. The computing device 802 may include one or more control servers 120, user devices 202, or other computing devices 802 configured to control one or more features of a controlled access area 108 or communicate with the control server(s) 120 or user device(s) 202. While FIG. 8 depicts a single block diagram 800 representative of a computing device 802, any number of networked computing devices 802 may perform the implementations described herein. For example, a first portion of the functions described herein may be performed by a control server 120, while a second portion of the functions are performed by a user device 202.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (12C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, weight sensors, code reading devices, RFID devices, NFC devices, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs (WLANs), wide area networks (WANs), wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more buses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 822 and one or more of the following modules may also be associated with the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices 802, network attached storage devices, and so forth.

The communication module 824 may be configured to establish communications with one or more other computing devices 802. Communications may be authenticated, encrypted, and so forth.

The memory 818 may also store the order verification module 204. The order verification module 204 may receive data indicative of codes received from a code reader 116 or other types of input indicative of an order 104 or item 102. The order verification module 204 may determine correspondence between the received input and order data 206 that associates particular orders 104 or items 102 with codes or other types of input. If the order data 206 corresponds to the received input, the order verification module 204 may generate control data 124 for granting access to a controlled access area 108 or to a container 106. For example, responsive to receipt of a code that matches a code for a particular order 104 or item 102, the order verification module 204 may cause a closure mechanism 114 to open.

The memory 818 may also store the item verification module 212. The item verification module 212 may receive data from sensors 134 indicative of characteristics of an item 102 detected by the sensors 134. For example, sensor data 136 from the sensors 134 may indicate a determined item weight, visible characteristics of an item 102, a radio frequency signal emitted by a tag or other device associated with the item 102, and so forth. The item verification module 212 may determine correspondence between the sensor data 136 and item data 216 that associates particular items 102 with corresponding sets of item characteristics 218. If the item data 216 corresponds to the sensor data 136, data indicative of the return of an item 102 may be generated.

The memory 818 may additionally store the area control module 222. The area control module 222 may be configured to receive user input 220 and determine correspondence between the user input 220 and control data 224 that associates user input 220 with elements of the controlled access area 108 that may be controlled using user input 220. For example, user input 220 may include commands to modify the brightness or color of one or more lights 130 or to modify image, audio, or video data output by one or more output devices 132. If the user input 220 corresponds to the control data 224, a feature of the controlled access area 108 that corresponds to the received user input 220 may be modified.

Other modules 826 may also be present in the memory 818. For example, encryption modules may be used to encrypt and decrypt communications between computing devices 802. Authentication modules may be used to authenticate communications sent or received by computing devices 802. Other modules 826 may also include modules for soliciting and receiving user input 220, determining relationships between items 102 and characteristics of items, and generating data offering related items 102 for sale or trial.

Other data 828 within the data store(s) 822 may include user input data, such as configurations and settings associated with computing devices 802. Other data 828 may include encryption keys and schema, access credentials, and so forth.

In different implementations, different computing devices 802 may have different capabilities or capacities. For example, control servers 120 may have greater processing capabilities or data storage capacity than user devices 202.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first code reading device;
   a first closure mechanism for controlling access to an area, wherein the first closure mechanism is in communication with the first code reading device;
   a second code reading device;
   a second closure mechanism for controlling access to a container within the area, wherein the second closure mechanism is in communication with the second code reading device;
   a weight sensor associated with the container and configured to determine a weight of one or more items within the container;
   an output device within the area, wherein the output device includes one or more of a display device or an audio device;
   one or more memories storing computer-executable instructions; and
   one or more hardware processors to execute the computer-executable instructions to:

receive a first code from the first code reading device, wherein the first code is associated with an order for one or more items;

determine first correspondence between the first code and order data indicative of one or more codes, wherein the one or more codes are associated with the order and with the one or more items;

in response to the first correspondence, open the first closure mechanism to provide access to the area;

receive a second code from the second code reading device, wherein the second code is associated with a first item of the one or more items;

determine second correspondence between the second code and the order data;

in response to the second correspondence, open the second closure mechanism to provide access to the container;

receive sensor data from the weight sensor, wherein the sensor data indicates a weight of an object placed in the container;

determine third correspondence between the sensor data and item data indicative of an expected weight of the first item;

generate data indicative of a return of the first item; and in response to the third correspondence, provide first output to the output device, wherein the first output indicates the return of the first item.

2. The system of claim 1, wherein the first item is associated with an item category, the system further comprising an input device within the area and computer-executable instructions to:

receive first user input from the input device, the first user input indicating a reason for returning the first item, wherein the reason indicates one or more first characteristics of the first item;

determine a second item associated with the item category, wherein the second item has one or more second characteristics that differ from the one or more first characteristics;

provide second output to the output device, wherein the second output offers the second item for one or more of a trial or a purchase; and receive second user input from the input device, wherein the second user input is associated with the second item.

3. The system of claim 1, further comprising computer-executable instructions to:

receive user input indicating completion of use of the area;

determine, based on the order data, that the one or more items include a second item, wherein the second item is associated with a third code not received from the second code reading device; and provide second output to one or more of the output device or a user device associated with the order, wherein the second output indicates one or more of a purchase or a trial of the second item.

4. The system of claim 1, wherein the container is movable relative to the area, the system further comprising computer-executable instructions to:

determine that one or more of a quantity of items, a weight of items, or a volume of items in the container exceeds one or more of a threshold quantity, a threshold weight, or a threshold volume; and transmit a notification requesting removal of the container.

5. A system comprising:

a first closure mechanism for controlling access to an area;

a first input device in communication with the first closure mechanism;

a container comprising a first chamber, a second chamber, a second closure mechanism that separates the first chamber from an exterior of the container, and a third closure mechanism that separates the first chamber from the second chamber;

a second input device in communication with the second closure mechanism;

a weight sensor associated with the container, wherein the weight sensor is configured to determine weights of items within the first chamber;

an output device within the area, wherein the output device includes one or more of a display device or an audio device;

one or more memories storing computer-executable instructions; and one or more hardware processors to execute the computer-executable instructions to:

receive first data from the first input device;

determine first correspondence between the first data and an order associated with a first item;

in response to the first data, cause the first closure mechanism to open to provide access to the area;

receive second data from the second input device;

determine second correspondence between the second data and the first item;

in response to the second data, cause the second closure mechanism to open to provide access to the container;

receive sensor data from the weight sensor, wherein the sensor data indicates a weight associated with one or more objects in the container;

determine third correspondence between the weight and item data that associates the first item with the weight; and in response to the third correspondence, generate data indicative of placement of the first item within the container and provide output indicative of a return of the first item to the output device.

6. The system of claim 5, further comprising computer-executable instructions to:

receive user input from one or more of the first input device, the second input device, or a third input device associated with the area; and in response to the user input, modify one or more visible characteristics of the area.

7. The system of claim 5, further comprising computer-executable instructions to:

determine a first characteristic and a second characteristic associated with the first item;

determine a second item having the first characteristic and lacking the second characteristic; and generate data indicative of an offer for one or more of a purchase or a trial of the second item.

8. The system of claim 7, further comprising computer-executable instructions to:

receive user input indicating that the second characteristic is associated with a reason for returning the first item, wherein the second item is determined in response to the user input.

9. The system of claim 5, further comprising computer-executable instructions to:

access stock data indicating one or more items stored in association with the area;

determine, based on fourth correspondence between the first item and the stock data, a second item that is related to the first item and stored in association with the area; and generate data indicative of availability of the second item.

10. The system of claim 5, further comprising computer-executable instructions to:
cause the third closure mechanism to open in response to the third correspondence between the item data and the weight determined based on the sensor data.

11. The system of claim 5, wherein the third first correspondence indicates that the first item lacks the weight indicated in the item data, the system further comprising computer-executable instructions to:
based on the third correspondence, cause the second closure mechanism associated with the container to open to provide access to the container for removal of the first item.

12. A method comprising:
receiving first data from a first input device, wherein the first input device is in communication with a first closure mechanism for controlling access to an area;
determining that the first data is associated with a first item;
in response to the first data, causing the first closure mechanism to open;
receiving second data from a second input device, wherein the second input device is in communication with a second closure mechanism for controlling access to a container;
determining that the second data is associated with the first item;
in response to the second data, causing the second closure mechanism to open;
determining sensor data from one or more weight sensors associated with the container;
determining, based on the sensor data, a weight of one or more objects in the container;
determining first correspondence between the weight and item data that associates the weight with the first item;
in response to the first correspondence, generating data indicative of a return of the first item;
determining a first characteristic and a second characteristic associated with the first item;
determining a second item having the first characteristic and lacking the second characteristic;
generating data indicative of an offer for one or more of a purchase or a trial associated with the second item; and
providing the data indicative of the return to an output device within the area, wherein the output device includes one or more of a display device or an audio device.

13. The method of claim 12, wherein the first input device includes a code reading device and the first data is indicative of a code, the method further comprising:

determining second correspondence between the code and order data that associates the code with the first item, wherein the second closure mechanism is opened in response to the second correspondence.

14. The method of claim 12, wherein:
the item data indicates an expected weight of the first item, and
the first correspondence includes a relationship between the expected weight and the weight of the first item.

15. The method of claim 12, further comprising:
using an image sensor having a field of view that includes at least a portion of an interior of the container to acquire image data representing the at least a portion of the interior of the container that includes the first item; and
determining second correspondence between the image data and the item data, wherein the item data indicates one or more expected visible characteristics of the first item, wherein the data indicative of the return is further generated in response to the second correspondence.

16. The method of claim 12, further comprising:
using a radio frequency signal detector to determine a radio frequency signal associated with the one or more objects; and
determining second correspondence between the radio frequency signal and the item data, wherein the item data indicates an expected radio frequency signal associated with the first item, and wherein the data indicative of the return is further generated in response to the second correspondence.

17. The method of claim 12, further comprising:
determining an order that includes the first item based on one or more of: the first data, the second data, or third data that is indicative of the order, wherein the first closure mechanism is opened further in response to determining the order.

18. The method of claim 12, further comprising:
determining a user device associated with an order that includes the first item; and
providing the data indicative of the return to the user device.

19. The method of claim 12, further comprising:
determining an order that includes the first item;
determining that the order includes a second item;
determining that third data indicative of the second item was not received; and
in response to a lack of receipt of the third data, generating data indicative of retention of the second item.

20. The method of claim 12, wherein the container includes: a first chamber, a second chamber, and a third closure mechanism separating the first chamber from the second chamber, the method further comprising:
in response to the first correspondence, causing the third closure mechanism to open for enabling movement of the first item into the second chamber.

* * * * *

UNITED STATES PATENT AND TRADEMARK OFFICE
CERTIFICATE OF CORRECTION

PATENT NO. : 11,868,954 B1
APPLICATION NO. : 16/054768
DATED : January 9, 2024
INVENTOR(S) : Rishabh Alaap Singh et al.

Page 1 of 1

It is certified that error appears in the above-identified patent and that said Letters Patent is hereby corrected as shown below:

In the Claims

Column 23, Claim 11, Line 11:
Currently reads: "The system of claim 5, wherein the third first correspondence"
Where it should read: --The system of claim 5, wherein the third correspondence--

Signed and Sealed this
First Day of April, 2025

Coke Morgan Stewart
*Acting Director of the United States Patent and Trademark Office*